United States Patent [19]

Liang et al.

[11] 4,258,109

[45] Mar. 24, 1981

[54] SOLID STATE CELLS

[75] Inventors: Charles C. Liang, Andover; Ashok V. Joshi, Burlington, both of Mass.

[73] Assignee: Duracell International Inc., Bethel, Conn.

[21] Appl. No.: 790,724

[22] Filed: Apr. 25, 1977

[51] Int. Cl.³ .......................................... H01M 10/36
[52] U.S. Cl. ..................................... 429/191; 429/218
[58] Field of Search ...................... 429/191, 193, 218

[56] References Cited

U.S. PATENT DOCUMENTS

| 3,117,035 | 1/1964 | Mrgudich | 429/191 |
| 3,791,867 | 2/1974 | Broadhead | 429/191 |
| 3,959,012 | 5/1976 | Liang et al. | 429/193 |
| 3,988,164 | 10/1976 | Liang et al. | 429/191 |
| 4,009,052 | 2/1977 | Whittingham | 429/191 |

Primary Examiner—Donald L. Walton
Attorney, Agent, or Firm—Ronald S. Cornell; Israel Nissenbaum; Martin M. Glazer

[57] ABSTRACT

High energy density solid state cells using cathode materials of ionically and electronically conductive dischargeable compounds in combination with other non-conductive cathode active materials of higher energy density.

10 Claims, No Drawings

SOLID STATE CELLS

This invention relates to high energy density cells utilizing solid electrolytes, solid active metal anodes and novel solid cathodes, and more particularly to such cells in which the cathodes contain an active material which is both ionically and electronically conductive.

Recently the state of electronics has achieved a high degree of sophistication especially in regard to devices utilizing integrated circuit chips which have been proliferating in items such as quartz crystal watches, calculators, cameras, pacemakers and the like. Miniaturization of these devices as well as low power drainage and relatively long lives under all types of conditions has resulted in a demand for power sources which have characteristics of rugged construction, long shelf life, high reliability, high energy density and an operating capability over a wide range of temperatures as well as concomitant miniaturization of the power source. These requirements pose problems for conventional cells having solution or even paste type electrolytes especially with regard to shelf life. The electrode materials in such cells may react with the electrolyte solutions and tend therefore to self discharge after periods of time which are relatively short when compared to the potential life of solid state batteries. There may also be evolution of gases in such cells which could force the electrolyte to leak out of the battery seals, thus corroding other components in the circuit which in sophisticated componentry can be very damaging. Increasing closure reliability is both bulky and costly and will not eliminate the problem of self discharge. Additionally, solution cells have a limited operating temperature range dependent upon the freezing and boiling points of the contained solutions.

Success in meeting the above demands without the drawbacks of solution electrolyte systems has been achieved with the use of solid electrolyte and electrode cells or solid state cells which do not evolve gases, self discharge on long standing or have electrolyte leakage problems. These systems however have had their own particular limitations and drawbacks not inherent in solution electrolyte cells.

Ideally a cell should have a high voltage, a high energy density, and a high current capability. Prior art solid state cells have however been deficient in one or more of the above desirable characteristics.

A first requirement and an important part of the operation of any solid state cell is the choice of solid electrolyte. In order to provide good current capability a solid electrolyte should have a high ionic conductivity which enables the transport of ions through defects in the crystalline electrolyte structure of the electrode-electrolyte system. An additional, and one of the most important requirements for a solid electrolyte, is that it must be virtually solely an ionic conductor. Conductivity due to the mobility of electrons must be neglible because otherwise the resulting partial internal short circuiting would result in the consumption of electrode materails even under open circuit conditions. Solution electrolyte cells include an electronically non-conductive separator between the electrode elements to prevent such a short circuit, whereas solid state cells utilize the solid electrolyte as both electronic separator and the ionic conductive species.

High current capabilities for solid state cells have been attained with the use of materials which are solely ionic conductors such as $RbAg_4I_5$ (0.27 ohm$^{-1}$ cm$^{-1}$ room temperature conductivity). However these conductors are only useful as electrolytes in cells having low voltages and energy densities. As an example, a solid state $Ag/RbAg_4I_5/RbI_3$ cell is dischargeable at 40 mA/cm$^2$ at room temperature but with about 0.2 Whr/in$^3$ and an OCV of 0.66V. High energy density and high voltage anodic materials such as lithium are chemically reactive with such conductors thereby precluding the use of these conductors in such cells. Electrolytes, which are chemically compatible with the high energy density and high voltage anode materials, such as LiI, even when doped for greater conductivity, do not exceed a room temperature conductivity of $5 \times 10^{-5}$ ohm$^{-1}$cm$^{-1}$. Thus, high energy density cells with an energy density ranging from about 5–10 Whr/in$^3$ and a voltage at about 1.9 volts for a Li/doped-LiI/PbI$_2$, PbS, Pb cell currently being produced are precluded from having an effective high current capability above 50 $\mu$A/cm$^2$ at room temperature. A further aggravation of the reduced current capability of high energy density cells is the low conductivity (both electronic and ionic) of active cathode materials. Conductivity enhancers such as graphite for electronic conductivity and electrolyte for ionic conductivity, while increasing the current capability of the cell to the maximum allowed by the conductivity of the electrolyte, reduce the energy density of the cell because of their volume.

Commerical feasibility in production of the electrolyte material is another factor to be considered in the construction of solid state cells. Thus, the physical properties of electrolytes such as $BaMg_5S_6$ and $BaMg_5Se_6$, which are compatible with a magnesium but not a lithium anode, and sodium beta aluminas such as $Na_2O$ 11 $Al_2O_3$, which are compatible with sodium anodes, will preclude the fabrication of cells having a high energy density or current capability even when costly production steps are taken. These electrolytes have ceramic characteristics making them difficult to work with especially in manufacturing process involving grinding and pelletization, with such processes requiring a firing step for structural integrity. Furthermore, the glazed material so formed inhibits good surface contact with the electrodes with a result of poor conductivity leading to poor cell performance. These electrolytes are thus typically used in cells with molten electrodes.

It is therefore an object of the present invention to increase the conductivity of the cathode of solid state cells in conjunction with high energy density anodes and compatible electrolytes such that there is an increase in energy density without current capability losses, while maintaining chemical stability between the cell components.

Generally the present invention involves the incorporation into the cathode of a solid state cell of a material which has the characteristics of being both ionically and electronically conductive as well as being able to function as an active cathode material. Normally cathodes require the incorporation of substantial amounts (e.g. over 20 percent by weight) of an ionic conductor such as that used as the electrolyte in order to facilitate ionic flow in the cathode during the cell reaction. This is especially true if the cathodic material is an electronic conductor since otherwise a reduction product would form at the cathode-electrolyte interface which would eventually block off a substantial amount of the ionic flow during discharge. However the incorporated ionic conductors in prior art cells have not generally been cathode active materials with the result of signficant capacity loss. Additionally, cathode active materials which are poor electronic conductors as well require the further incorporation of electronically conductive materials which further reduces the cell's energy capacity. By combining the functions of electronic and ionic and conductivity with cathode activity a higher energy density and current capability is attained with the need for space wasting conductors being obviated.

Examples of materials having the requisite characteristics of ionic and electronic conductivity and which are cathodically active as well as being compatible with electrolytes used in high energy density cells include the following metal chalcogenides: $CoTe_2$, $Cr_2S_3$, $HfS_2$, $HfSe_2$, $HfTe_2$, $IrTe_2$, $MoS_2$, $MoSe_2$, $MoTe_2$, $NbS_2$, $NbSe_2$, $NbTe_2$, $NiTe_2$, $PtS_2$, $PtSe_2$, $PtTe_2$, $SnS_2$, $SnSSe$, $SnSe_2$, $TaS_2$, $TaSe_2$, $TaTe_2$, $TiS_2$, $TiSe_2$, $TiTe_2$, $VS_2$, $VSe_2$, $VTe_2$, $WS_2$, $WSe_2$, $WTe_2$, $ZrS_2$, $ZrSe_2$, and $ZrTe_2$, wherein the chalcogenide is a sulfide, selenide, telluride or a combination thereof.

Also included are the non-stoichiometric metal chalcogenide compounds such as $Li_xTiS_2$ where $x<1$, which to some extent contain the complexed form of one of the cathode materials with the anodic cation and which are believed to be intermediate reaction products during cell discharge.

Further materials which are ionically-electronically conductive, cathode active include metal oxides such as $TiO_2$, $MoO_3$, $Ta_2O_5$, $V_2O_5$, and $WO_3$ and non-stoichiometric metal oxides such as non-stoichiometric manganese oxide; metal iodides such as $CdI_2$, $FeI_2$, $GeI_2$, $MnI_2$, $TiI_2$, $TlI_2$, $VI_2$ and $YbI_2$; metal hydroxides such as $Cd(OH)_2$, $Fe(OH)_2$, $Mn(OH)_2$, and $Ni(OH)_2$; and non-metal chalcogenides such as $SiTe_2$ and $CS_n$ wherein n is between about 0.001 and 1.0. The $CS_n$ compound is made in accordance with the method set forth in an article by R. C. Croft in the Australian Journal of Chemistry, Vol. 9, pp. 201–205, 1956, the disclosure of which is incorporated herein by reference.

In order for the ionically-electronically conductive cathode active material to be commercially useful in high voltage cells with lithium anodes it should preferably be able to provide a voltage couple with lithium at least an O.C.V. of 1.5 volts and most preferably above 2 volts.

The operating voltage of the ionically-electronically conductive cathode active material should preferably be roughly equivalent to the voltage of the higher energy density non-conductive cathode active material mixed therewith to avoid detrimental voltage fluctuations.

A further criteria for the above cathodic material is that both the ionic and electronic conductivities of the cathode active material should range between $10^{-10}$ and $10^2$ ohm$^{-1}$ cm$^{-1}$ with a preferred ionic conductivity of more than $10^{-6}$ and an electronic conductivity greater than $10^{-3}$, all at room temperature.

In addition, and most importantly, the ionically-electronically conductive, active cathode material must be compatible with the solid electrolytes used in the high energy density cells.

The solid electrolytes used in high energy density lithium cells are lithium salts and have room temperature ionic conductivities greater than $1 \times 10^{-9}$ ohm$^{-1}$ cm$^{-1}$. These salts can either be in the pure form or combined with conductivity enhancers such that the current capability is improved thereby. Examples of lithium salts having the requisite conductivity for meaningful cell utilization include lithium iodide (LiI) and lithium iodide admixed with lithium hydroxide (LiOH) and aluminum oxide ($Al_2O_3$), with the latter mixture being referred to as LLA and disclosed in U.S. Pat. No. 3,713,897.

High energy density solid electrolyte cells may have as their anodes materials similar to lithium which have high voltage and low electrochemical equivalent weight characteristics. Suitable anodic materials include metals from Groups IA and IIA of the Periodic Table such as sodium, potassium, beryllium, magnesium and calcium as well as aluminum from Group IIIA and other metals above hydrogen in the EMF series.

Cells with other anodes can utilize corresponding salts as electrolytes, such as sodium salts for a cell with a sodium anode. Additionally, electrolyte salts with useful conductivities and having a cation of a metal of a lower EMF than that of the anode metal may also be useful.

It is postulated that the aforementioned ionically-electronically conductive, cathode active materials react with the ions of the anode (e.g. lithium cations) to form a non-stoichiometric complex during the discharge of the cell. This complexing of cations allows them to move from site to site thereby providing ionic conductivity. Additionally the above compounds provide the free electrons necessary for electronic conductivity.

The above compounds are admixed with other compounds or elements which provide a greater energy density but which cannot be utilized in and of themselves because of their inability to function as ionic and/or electronic conductors. The inclusion of the ionically-electronically conductive, cathode active material thereby increases the capacity of the cell by obviating the need for non-dischargeable conductive materials. Furthermore, when the conductive, active material is homogeneously admixed with the higher energy density compound the realizable utilization of the so formed cells approximates that of the theoretical. A limiting factor in solid state cell performance is the conductivity of the cell reaction product. A low conductivity product results in large internal resistance losses which effectively terminate cell usefulness. Thus in cells having the above ionically-electronically conductive, cathode active material the complexed reaction product retains conductivity thereby enabling full utilization of other active cathode materials with non-conductive reaction products which are in proximity therewith. One of the drawbacks of cells with cathodes which result in the formation of low ionically conductive reaction products, especially at the cathode electrolyte interface, has been the choking off thereby of further utilization of these cells. However, the inclusion of the ionically-electronically conductive cathode active materials provides a more uniform distribution of the reaction product throughout the cathode structure because of their ionically conductive characteristics which provide a homogeneously dispersed product. Since the reaction products of the present ionically conductive materials retain conductivity, further utilization of the cell is also possible with the non-conductive active material in conductive proximity with the conductive active material.

A small amount of electrolyte can also be included in the cathode structure in order to blur the interface between cathode and electrolyte thereby providing more intimate electrical contact between the cathode and the electrolyte. This enables the cell to operate at higher current drains for longer periods of time. Additionally, the electrolyte inclusion can increase the ionic conductivity of the cathode should the ionically conductive cathode active material have a lower conductivity than that of the electrolyte. This inclusion however, if made, should not exceed 10% by weight since greater amounts would merely decrease the energy density of the cell with little if any further tradeoff in terms of current drain capacity. Therefore, cathode active materials provide at least 90% of the total cathode weight.

The following examples illustrate the high energy density and utilizability of a non-conductive chalcogenide containing cathode in a solid state cell with the abovementioned ionically and electronically conductive, cathode active materials. ("non-conductive chalcogenide" refers to a chalcogenide which is non-conductive with respect to electrons and/or ions produced by discharge reaction) Non-conductive chalcogenides in and of themselves normally cannot be effectively used as cathodes in solid state cells unless they contain substantial amounts of ionic and electronic conductors which constitute 30% or more of the total cathode by weight. Thus, the inclusion into the non-conductive chalcogenide cathode of an ionically and electronically conductive cathode active material enables the usage of the non-conductive material without the concomitant severe losses of energy capacity. Examples of non-conductive chalcogenides which can be admixed with the ionically-electronically conductive cathode materials include silver sulfide ($Ag_2S$), lead sulfide (PbS), copper sulfide (CuS), lead selenide (PbSe), lead telluride (PbTe), antimony sulfides ($Sb_2S_5$) and ($Sb_2S_3$), bismuth sulfide ($Bi_2S_3$), tin telluride (SnTe), mercury sulfide (HgS), arsenic sulfide ($As_2S_3$), arsenic selenide ($As_2Se_3$), antimony telluride ($Sb_2Te_3$) and selenium sulfide ($SeS_2$).

In the following examples as throughout the entire specification and claims all parts and percentages are parts by weight unless otherwise specified. The examples are given for illustrative purposes only and specific details are not to be construed as limitations.

EXAMPLE 1

A solid state cell made of a lithium metal disc having dimensions of about 1.47 cm$^2$ surface area by about 0.01 cm thickness; a cathode disc having dimensions of about 1.82 cm$^2$ surface area by about 0.02 cm thickness, consisting of 50% $TiS_2$ and 50% $As_2S_3$, and weighing 100 mg; and a solid electrolyte therebetween with the same dimensions as the cathode and consisting of LiI, LiOH, $Al_2O_3$ in a 4:1:2 ratio is formed by pressing electrolyte with the cathode at a pressure of about 100,000 psi and subsequently pressing the anode to the other side of the electrolyte at a pressure of about 50,000 psi. The cell is discharged at 72° C. under a load of 188 $\mu$A. The cell realizes 2 milliamp hours (mAH) to 2 volts, about 31 mAH to 1.5 volts and about 38 mAH to 1 volt.

EXAMPLE 2

A solid state cell made in accordance with the cell of EXAMPLE 1 is discharged at room temperature under a load of 36 $\mu$A. The cell realizes about 22 mAH to 1.5 volts and about 27 mAH to 1 volt.

EXAMPLE 3

A solid state cell is made in accordance with the cell of EXAMPLE 1 but with $Sb_2S_3$ in place of $As_2S_3$. The cell is discharged at room temperature under a load of 36 $\mu$A. The cell realizes about 22 mAH to 1.5 volts and about 32 mAH to 1 volt.

EXAMPLE 4

A solid state cell made in accordance with the cell of EXAMPLE 1 but with $Sb_2S_5$ in place of $As_2S_3$ and with a cathode weight of 200 mg is discharged at room temperature under a load of 27 $\mu$A. The cell realizes about 7 mAH to 2 volts, about 11 mAH to 1.5 volts and about 14 mAH to 1 volt.

EXAMPLE 5

A solid state cell made in accordance with the cell of EXAMPLE 1 but with $SeS_2$ in place of $As_2S_3$ and with a cathode weight of 50 mg is discharged at 60° C. under a load of 180 $\mu$A. The cell realizes about 5 mAH to 2 volts, about 18 mAH to 1.5 volts and about 22 mAH to 1 volt.

It is understood that changes in and variations of the invention as described herein can be made without departing from the scope of the present invention as defined in the following claims.

What is claimed is:

1. A solid state electrochemical cell comprising a solid active metal anode, a solid electrolyte and a solid cathode wherein said cathode consists of at least 90% cathode active materials and wherein said cathode consists essentially of a cathode active material having room temperature ionic and electronic conductivities ranging between $10^{-10}$ to $10^2$ ohm$^{-1}$ cm$^{-1}$ and a cathode active non-conductive chalcogenide.

2. The solid state cell of claim 1 wherein said conductive cathode active material is selected from the group consisting of metal oxides non-stoichiometric metal oxides, metal iodides, metal hydroxides and metal and non-metallic chalcogenides.

3. The solid state cell of claim 2 wherein said conductive cathode active material is a metal chalcogenide.

4. The solid state cell of claim 3 wherein said conductive cathode active material is titanium disulfide.

5. The solid state cell of claim 1 wherein said non-conductive chalcogenide is selected from the group consisting of silver sulfide ($Ag_2S$), lead sulfide (PbS), copper sulfide (CuS), lead selenide (PbSe), lead telluride (PbTe), antimony sulfides ($Sb_2S_5$) and ($Sb_2S_3$), bismuth sulfide ($Bi_2S_3$), tin telluride (SnTe), mercury sulfide (HgS), arsenic sulfide ($As_2S_3$), arsenic selenide ($As_2Se_3$), antimony telluride ($Sb_2Te_3$) and selenium sulfide ($SeS_2$).

6. The solid state cell of claim 1 wherein said solid anode comprises lithium.

7. The solid state cell of claim 1 wherein said solid electrolyte includes lithium iodide.

8. The solid state cell of claim 6 wherein said conductive cathode active material is titanium disulfide.

9. The solid state cell of claim 8 wherein said non-conductive chalcogenide is selected from the group consisting of $As_2S_3$, $Sb_2S_3$, $Sb_2S_5$ and $SeS_2$.

10. The solid state cell of claim 2 wherein said conductive cathode active material is selected from the group consisting of $TiO_2$, $MoO_3$, $Ta_2O_5$, $V_2O_5$, $WO_3$, non-stoichiometric manganese oxide, $CdI_2$, $FeI_2$, $GeI_2$, $MnI_2$, $TiI_2$, $TlI_2$, $VI_2$, $YbI_2$, $Cd(OH)_2$, $Fe(OH)_2$, $Mn(OH)_2$, $SiTe_2$, and $CS_n$, wherein "n" is between 0.001 and 1.0.

* * * * *